US 8,401,994 B2

(12) United States Patent
Hoang et al.

(10) Patent No.: US 8,401,994 B2
(45) Date of Patent: Mar. 19, 2013

(54) DISTRIBUTED CONSISTENT GRID OF IN-MEMORY DATABASE CACHES

(75) Inventors: Chi Hoang, Palo Alto, CA (US); Tirthankar Lahiri, Palo Alto, CA (US); Marie-Anne Neimat, Atherton, CA (US); Chih-Ping Wang, Palo Alto, CA (US); John Miller, Los Altos, CA (US); Dilys Thomas, Redwood City, CA (US); Nagender Bandi, Redwood City, CA (US); Susan Cheng, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 638 days.

(21) Appl. No.: 12/562,928

(22) Filed: Sep. 18, 2009

(65) Prior Publication Data
US 2011/0072217 A1 Mar. 24, 2011

(51) Int. Cl.
*G06F 17/00* (2006.01)
(52) U.S. Cl. ...................................... 707/609
(58) Field of Classification Search .................. None
See application file for complete search history.

(56) References Cited

U.S. PATENT DOCUMENTS

| | | | | |
|---|---|---|---|---|
| 6,370,622 B1* | 4/2002 | Chiou et al. | ............... | 711/146 |
| 6,611,898 B1* | 8/2003 | Slattery et al. | ............... | 711/118 |
| 7,548,898 B1* | 6/2009 | Tarenskeen et al. | ... | 707/999.001 |
| 2003/0217236 A1* | 11/2003 | Rowlands | ............... | 711/145 |
| 2004/0073754 A1* | 4/2004 | Cypher | ............... | 711/143 |
| 2004/0122910 A1 | 6/2004 | Douglass et al. | | |
| 2008/0155303 A1 | 6/2008 | Toeroe | | |
| 2008/0209009 A1* | 8/2008 | Katwala et al. | ............... | 709/219 |
| 2008/0215580 A1* | 9/2008 | Altinel et al. | .......... | 707/999.005 |
| 2008/0222111 A1 | 9/2008 | Hoang et al. | | |
| 2008/0222159 A1 | 9/2008 | Aranha et al. | | |
| 2009/0171679 A1* | 7/2009 | Salgado et al. | ............... | 705/1 |
| 2010/0306234 A1* | 12/2010 | Wang et al. | ............... | 707/769 |
| 2011/0071981 A1 | 3/2011 | Ghosh et al. | | |

OTHER PUBLICATIONS

The Times Ten Team, Mid-Tier Caching: The Times Ten Approach, Jun. 2002, ACM SIGMOD, pp. 588-593.*
Oracle®, "TimesTen to TimesTen Replication Guide" Release 7.0, B31684-03, Sep. 2007. http://download.oracle.com/otn_hosted_doc/timesten/703/TimesTen-Documentation/replication.pdf.

(Continued)

*Primary Examiner* — Neveen Abel Jalil
*Assistant Examiner* — Jacques Veillard
(74) *Attorney, Agent, or Firm* — Hickman Palermo Truong Becker Bingham Wong LLP; Karl T. Rees

(57) ABSTRACT

A plurality of mid-tier databases form a single, consistent cache grid for data in a one or more backend data sources, such as a database system. The mid-tier databases may be standard relational databases. Cache agents at each mid-tier database swap in data from the backend database as needed. Consistency in the cache grid is maintained by ownership locks. Cache agents prevent database operations that will modify cached data in a mid-tier database unless and until ownership of the cached data can be acquired for the mid-tier database. Cache groups define what backend data may be cached, as well as a general structure in which the backend data is to be cached. Metadata for cache groups is shared to ensure that data is cached in the same form throughout the entire grid. Ownership of cached data can then be tracked through a mapping of cached instances of data to particular mid-tier databases.

31 Claims, 7 Drawing Sheets

OTHER PUBLICATIONS

Oracle®, "TimesTen Cache Connect to Oracle Guide" Release 7.0, B31685-03, Sep. 2007. http://download.oracle.com/otn_hosted_doc/timesten/703/TimesTen-Documentation/cacheconnect.pdf.

Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.

U.S. Appl. No. 12/719,264, filed Mar. 8, 2010, Final Office Action, May 10, 2012.

U.S. Appl. No. 12/719,264, filed Mar. 8, 2010, Restriction Requirement, Nov. 18, 2011.

U.S. Appl. No. 12/719,264, filed Mar. 8, 2010, Notice of Allowance, Mar. 8, 2010.

* cited by examiner

United States Patent US 8,401,994 B2

DISTRIBUTED CONSISTENT GRID OF IN-MEMORY DATABASE CACHES

CROSS-REFERENCE TO RELATED APPLICATIONS

This application is related to U.S. patent application Ser. No. 12/030,113, filed Feb. 12, 2008, entitled "Database System with Dynamic Database Caching," by Hoang et al.; and U.S. patent application Ser. No. 12/030,094, filed Feb. 12, 2008, entitled "DATABASE SYSTEM WITH ACTIVE AND STANDBY NODES," by Aranha et al., the entire contents of each of which are hereby incorporated by reference for all purposes as if fully set forth herein.

FIELD OF THE INVENTION

Embodiments of the invention described herein relate generally to database caching, and, more specifically, to techniques for caching backend data using grids of mid-tier databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Service providers provide end users with services that involve data originating from persistent data sources. The data sources themselves are often unequipped to provide such services. Instead, end users connect via clients to applications that provide these services. Applications, in turn, interact with the data sources to provide these services.

Databases and Database Servers

One source of data is a database. A database is a collection of logically related data and metadata. From a high-level perspective, that data and metadata is organized into logical structures, for example, according to relational and/or object-relational database constructs. Database metadata defines database objects, such as tables, object tables, views, or complex types.

One database implementation involves the maintenance of data representative of the database in a storage mechanism such as, for example, a persistent storage device. A database server or like process provides access to the data and metadata by reading from and writing to the storage. In many cases, the data representative of the database is stored in storage-based structures that differ from the logical structure of the database—for example, in data blocks on a hard disk. Accordingly, the database server translates some of the data representative of the database into logical structures, such as tables, rows, and columns, in order to perform operations that make reference to those logical structures. When the database server has finished performing the operations, if data in any of the logical structures has changed, the database server translates the logical structures back into the storage-based structures and causes those structures to be stored in the storage.

Applications interact with database servers via database commands such as SQL statements. These database commands cause the database servers to perform the above mentioned database operations. These operations may include, for example, providing a subset of data to the application, modifying records in the database, searching for data that meets certain criteria, sorting data, performing an analysis of the data, and so on. In many cases, as a result of the operations, database servers return "result sets" to the applications in the form of logically structured data.

Tiers

Conceptually, the above described interactions are characterized as occurring across three levels or "tiers." The first of these levels is known as the "client-side," and involves the end user operating a client. For example, an end user may operate a web browser or other user interface to request online services such as booking a flight. Or, as another example, a user may operate a cell phone to request a telephone service.

The second level is a server-side level known as the "mid-tier," and involves applications. Generally, a component may be described in the "mid-tier" if it is deployed between two components in a chain of interactions—more specifically, if it responds to requests from one component by sending a request to another component. As used herein, however, the term "mid-tier" typically refers to any component that responds to requests from any other component by interacting with data originating from one or more backend data sources, such as a backend database server. For example, a website running at the mid-tier may provide a web interface for booking a flight to a user, and in response to requests from the user, request flight data from a database server. Or, as another example, cellular switching software at the mid-tier may rely on data from a database server to determine how to respond to a cell phone's request to make a call.

The final level is a server-side level known as the "backend," and involves one or more data sources, such as a file system, web server, or a database server and database. For example, where the one or more backend data sources is a database, the backend level comprises, essentially, one or more persistent databases stored at one or more persistent storage devices, any database servers that interact directly with the persistent storage device to provide access to logical structures stored in the one or more persistent databases, and any components that manage the persistent storage devices or the backend database servers. For example, the backend may comprise a clustered database system that is managed by a cluster manager.

Because backend database systems are a particularly common form of backend data, the remainder of this application shall refer extensively to the use of backend database systems. However, the techniques described herein are just as applicable to any other source of data stored persistently at the backend level.

In some embodiments, the computing devices implementing components at each level are physically distinct from the computing devices at each other level. For example, database servers and mid-tier applications are often implemented at different computing devices. However, in other embodiments, physical separation is not strictly maintained.

Mid-Tier Databases

For some applications, it is advantageous to implement one or more database systems on computing devices that may be considered to be physically distinct mid-tier computing devices. Mid-tier databases provide mid-tier applications with faster access to data by bringing the data closer to the applications. Moreover, in some embodiments a mid-tier database may be stored entirely within a memory that is faster than the storage mechanism used predominately for the backend databases, further increasing the speed with which mid-tier applications can access data. For example, data representative of a mid-tier database may be stored in a volatile, random access memory. However, benefits may be realized from using a mid-tier database even without the mid-tier database being stored in such a memory.

Mid-Tier Caching

In an embodiment, only a small subset of the data required by the mid-tier applications can be maintained in the mid-tier level. This may be true for a variety of reasons. For example, the amount of memory or storage available at the mid-tier level may be much smaller than the amount of data in needed by the mid-tier application. For this reason, the mid-tier applications rely on a backend database. Unfortunately, access to a backend database incurs various "roundtrip" communication costs resulting from, for example, transmission overhead, limited transmission spends, and/or limited transmission bandwidth. Thus, mid-tier applications sometimes cache certain objects from the backend database at the mid-tier level.

One technique for implementing a mid-tier cache is to utilize a mid-tier database as a cache of certain critical data in the backend database. The subset of data stored in the mid-tier database may be selected because it is most frequently accessed or most critical to the mid-tier applications. For other data, the mid-tier applications access the backend database. In this manner, a mid-tier database can be used to cache frequently accessed data from the backend database so as to avoid requiring the mid-tier applications to constantly incur round-trips to the backend database server.

In an embodiment, a cache agent is responsible for controlling which elements of the database are cached in the mid-tier database. For example, the cache agent implements a policy that calls for loading cached copies or "instances" of backend elements into the mid-tier database dynamically when their corresponding elements are requested by the mid-tier applications. The cache agent also manages the size of the mid-tier database by ensuring that older and/or less used cache instances are removed from the mid-tier database as needed. An example of such an embodiment is described in "Database System with Dynamic Database Caching."

Directly-Linked Mid-Tier Applications

In some embodiments, mid-tier applications execute in the same memory space that stores the mid-tier database, and thus may read and write directly to the mid-tier database. Thus, these mid-tier applications forego the need to establish a communication link with a database server, further increasing the speed with which the mid-tier applications may access data in the mid-tier database. Such mid-tier applications are hereinafter referred to as "directly-linked" applications. A vendor may simplify development of directly-linked mid-tier applications for third parties with the provision of pre-compiled libraries of instructions that perform many of the same functions as a database server, as well as an application programming interface (API) for utilizing those instructions. For convenience, any functions described herein as being performed by a database server at the mid-tier level, may also be understood as being performed by an executing instance of such instructions, invoked by a directly-linked application.

Note that the internal functioning of a mid-tier database server is different than a backend database server, and thus the two types of database servers are not to be confused. For example, mid-tier database servers may be optimized to compile queries differently than backend database servers, owing to factors such as differing assumptions about the speed at which data may be retrieved from memory, as well as consideration of the caching relationship between the backend database and the mid-tier database.

Reliability of Mid-Tier Databases

One challenge in deploying mid-tier databases is dealing with failures of the mid-tier databases. One approach is to deploy multiple copies of the mid-tier database. Each copy of the mid-tier database is monitored by one or more processes that propagate transactions to other copies of the mid-tier database. The mid-tier applications are made aware of these multiple copies, and when one of the copies fails, the mid-tier applications are configured to interact instead with another copy of the mid-tier database.

One such scheme is described in "DATABASE SYSTEM WITH ACTIVE AND STANDBY NODES." An active copy and a standby copy of a mid-tier database are maintained. Both copies may be readable. However, applications may only perform write operations at the active copy. Transactions at the active copy are propagated to the standby copy. When the active copy fails, a database administrator sends a command to a process linked to the standby copy to cause the standby copy to become the active copy. The administrator also sends commands to restart any directly linked applications, so that they are linked to the new active copy. Applications and clients can then be configured to interact with the new active copy instead of the failed active copy.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
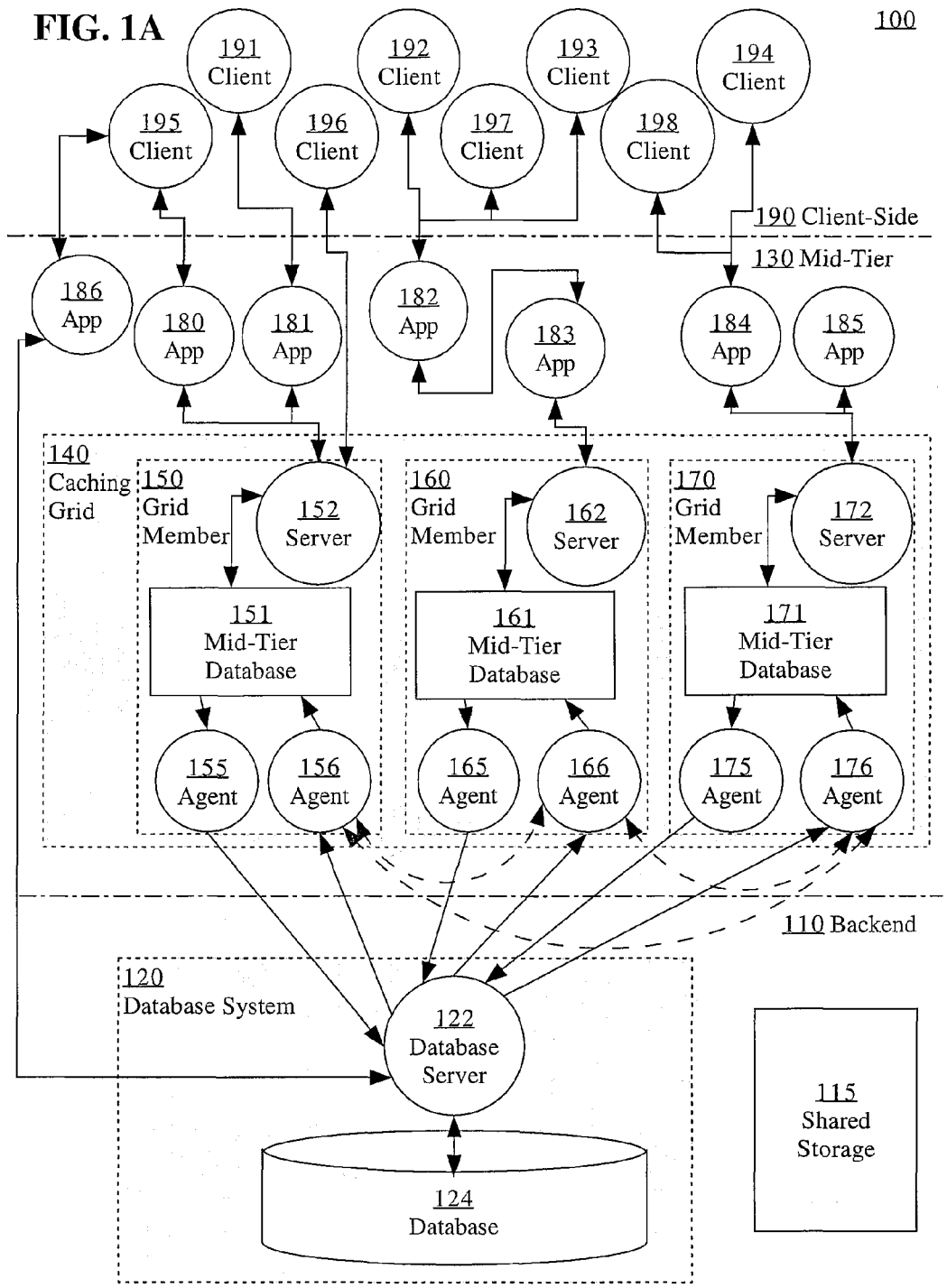
FIGS. 1A and 1B are block diagrams of a system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview 2.1. Tiers
2.2. Mid-Tier Caching Grid
2.3. Cache groups
2.4. Shared Cache Groups
3.0. Functional Overview
 3.1. Example Implementation
 3.2. Differentiating Between Data in a Shared Cache Group and Other Data in a Mid-Tier Database
 3.3. Simplified Method For Embodiments With Implied Ownership
4.0. Other Example Implementation Details
 4.1. Creating/Adding to a Grid
 4.2. High availability
5.0. Implementation Mechanism—Hardware Overview
6.0. Extensions and Alternatives 1.0. General Overview Approaches, techniques, and mechanisms are disclosed for providing better caching of backend data at mid-tier databases. According to an embodiment, a plurality of mid-tier databases is defined collectively as a cache grid to provide caching for mid-tier applications. One or more processes coupled to the mid-tier databases ensure that for any backend element cached in the grid, the grid maintains a single, consistent shared cache instance of that element, thereby allowing applications to utilize mid-tier caching at multiple mid-tier databases without concern for complications arising from modifying cache instances in conflicting ways at two separate mid-tier databases.

In contrast to mid-tier caches that require an application to be directly connected to a mid-tier database whose cache has been specifically customized for the application, the grid functions in a location transparent manner so that any application can take advantage of the cache while connected to any mid-tier database in the grid. Accordingly, mid-tier applications may take advantage of cached data at the mid-tier level without being tied to a specific mid-tier database. Moreover, the grid provides cache consistency without requiring complicated user workarounds—for example, the grid makes it possible to utilize multiple mid-tier databases as a cache without requiring that each of the user's applications be customized to coordinate a cache partitioning scheme amongst the multiple mid-tier databases. Furthermore, as opposed to object based distributed caches, the use of a transactional database at each node of the cache ensures the transactional consistency of the cached data.

Each mid-tier database may store cache instances of, potentially, entirely disjoint backend data. Thus the volume of backend data that can be cached at the mid-tier greatly increases, both reducing the demand on the backend database and increasing the likelihood that mid-tier applications will have access to cached copies of the data they need. Each mid-tier database may provide caching for, potentially, different mid-tier applications, decreasing the demand on any single mid-tier database and thus increasing the work capacity of any given mid-tier application that relies on the mid-tier database.

According to an embodiment, for each shared cache instance in the grid, ownership of that cache instance at any given time is assigned exclusively to only one of the mid-tier databases in the grid. Write operations on a cache instance may only be performed at the mid-tier database currently assigned ownership of the cache instance. Thus, for an application to modify a cache instance at a particular mid-tier database, the particular mid-tier database must acquire ownership of the cache instance. In other embodiments, mid-tier databases must acquire ownership for some or all read operations as well.

According to an embodiment, the one or more processes ensure that, at any given time, no more than one mid-tier database stores a cache instance for any given element in a set of backend elements. If a mid-tier database stores a cache instance, the mid-tier database is implied to be the owner of that mid-tier database. Otherwise, if the grid contains no cache instance for a requested element, a cache instance of that element is loaded from the backend to the mid-tier database. If the grid maintains a cache instance of the requested element at another mid-tier database, any outstanding transactions involving the cache instance are committed at that other mid-tier database and the cache instance is then loaded into the mid-tier database from which the element was requested. In other embodiments, however, multiple copies of a cache instance are maintained in the grid, kept consistent by other means, such as replication of changes from one mid-tier database to another or invalidation of other copies of a cache instance upon changes to a first one of the copies.

According to an embodiment, each of the mid-tier databases in the grid is defined by a different schema. Although subsets of the schemas for each mid-tier database may share common schema definitions for globally consistent objects, the schemas differ because each mid-tier database may contain data that is not defined as belonging to the grid. For example, a mid-tier database may store certain temporary tables used exclusively by a mid-tier application directly linked to the mid-tier database, which tables are not to be replicated at the backend. As another example, the mid-tier database may store certain "local" cache instances of backend elements for which the grid does not maintain consistency.

According to an embodiment, the grid maintains certain metadata describing "cache groups." Cache groups define which backend elements are to be cached in the mid-tier database, as well as the form in which they are to be cached (i.e. the structure of the cache instances). For example, a particular cache group may define as cacheable a particular primary table, as well as zero or more other tables whose foreign keys match the primary table's primary key. The cache group may also indicate that each "cache instance" for the particular cache group may be a row from the primary table and any rows from the other identified tables whose foreign keys have the same value as that row's primary key. However, cache groups and cache instances may instead be associated with any other database element(s), at any level of granularity. Certain cache groups are designated as "shared" or "global," meaning that all cache instances defined by such cache groups are considered to be in the grid. Other cache groups are "local," meaning that all cache instances in such cache groups are "local" as described above.

According to an embodiment, one or more processes associated with the mid-tier databases in the grid further ensure that all changes to cache instances in the mid-tier databases are propagated to the corresponding backend database element.

In other aspects, the invention encompasses a computer apparatus and a computer-readable medium configured to carry out the foregoing steps.

2.0. Structural Overview

FIG. 1A is a block diagram of a system 100 in which the techniques described herein may be practice, according to an embodiment of the invention. FIG. 1A is but one example of a system capable of implementing the techniques described herein. Other systems may include more or fewer components in different arrangements. Moreover, the distribution of work between components may vary from system to system.

2.1. Tiers

System 100 comprises a backend 110, mid-tier 150, and client-side 190. Backend 110 comprises a shared storage space 115 and a database system 120. Mid-tier 130 comprises a caching grid 140 and multiple applications 180-186. Client-side comprises clients 190-198.

Clients 190-198 may be, for example, web browsers, desktop applications, mobile applications, and so on. Clients 190-198 request services from mid-tier applications 180-186. Mid-tier applications 180-186 may be, for example, web applications, servers, service providers, and so forth. In an embodiment, mid-tier applications 180-186 are any applications that rely upon data originating from backend database 124 that were not provided by the vendor of backend database 124. However, in other embodiments, some or all of mid-tier applications 180-186 may be vendor-provided. To provide the services requested by clients 190-198, mid-tier applications 180-186 rely on data that is persistently maintained at database system 120, some of which data is cached for more efficient access at caching grid 140.

Database system 120 comprises a database server 122 and a database 124. Database 124 is a collection of logically related data stored at, for example, one or more persistent storage devices such as hard disks or storage arrays. Database 124 may be, for example, a relational database. Database server 122 provides direct access to database 124 for application 186. Specifically, database server 122 responds to database commands from application 186 by performing operations for storing, retrieving, and manipulating data stored in database 124. Database server 122 further provides indirect access to database 124 for applications 152, 162, 172, and 180-185 by providing data to be cached in caching grid 140. While the depicted embodiment consists of only a single backend database system with a single backend database server and backend database, other embodiments permit caching of data from multiple backend database systems with multiple database servers and multiple databases.

Database servers 152, 162, and 172 provide applications 180-185 with access to the data in mid-tier databases 151, 161, and 171. Database servers 152, 162, and 172 are implementations of database access routines that respond to database commands by performing operations for storing, retrieving, and manipulating data stored in mid-tier databases 151, 161, or 171, respectively. In an embodiment, a vendor-provided server process invokes database servers 152, 162, and 172 to handle database commands received from applications 180-185.

In an embodiment, one or more of database servers 152, 162, and 172 may be temporary instances of database access routines, instantiated as needed for single sets of database commands. In such embodiments, database servers 152, 162, and 172 are instantiated via calls to a database library API by a directly-linked application. For example, some of applications 180-185 may be directly-linked in memory to one of mid-tier databases 151, 161, or 171. Those applications may therefore invoke a database server thread 152, 162, and 172 only when necessary to perform database operations. Note that, because each database application may invoke its own database server thread, multiple database server threads may run concurrently. In an embodiment, database servers 152, 162, and 172 may be invoked both directly by database server 152, 162, and 172, as well as by a background database server process.

2.2. Mid-Tier Caching Grid

Caching grid 140 comprises grid members 150, 160, and 170. In some embodiments, grid members 150, 160, and 170 are each implemented at a physically distinct set of one or more networked computing devices. In other embodiments, grid members 150, 160, and 170 are simply logical groupings of their respective subcomponents.

Grid members 150, 160, and 170 comprise mid-tier databases 151, 161, and 171, respectively. Mid-tier databases 151, 161, and 171 are separate and distinct collections of logically related data stored at computer devices executing in the mid-tier. For example, mid-tier databases 151, 161, and 171 may be relational databases residing in a shared volatile memory space. However, mid-tier databases 151, 161, and 171 may be any type of database stored in any type of storage mechanism. In an embodiment, mid-tier databases 151, 161, and 171 are entirely self-contained relational databases with no shared resources. Mid-tier databases 151, 161, and 171 may have different schemas and store different sets of data.

Figure 1B:
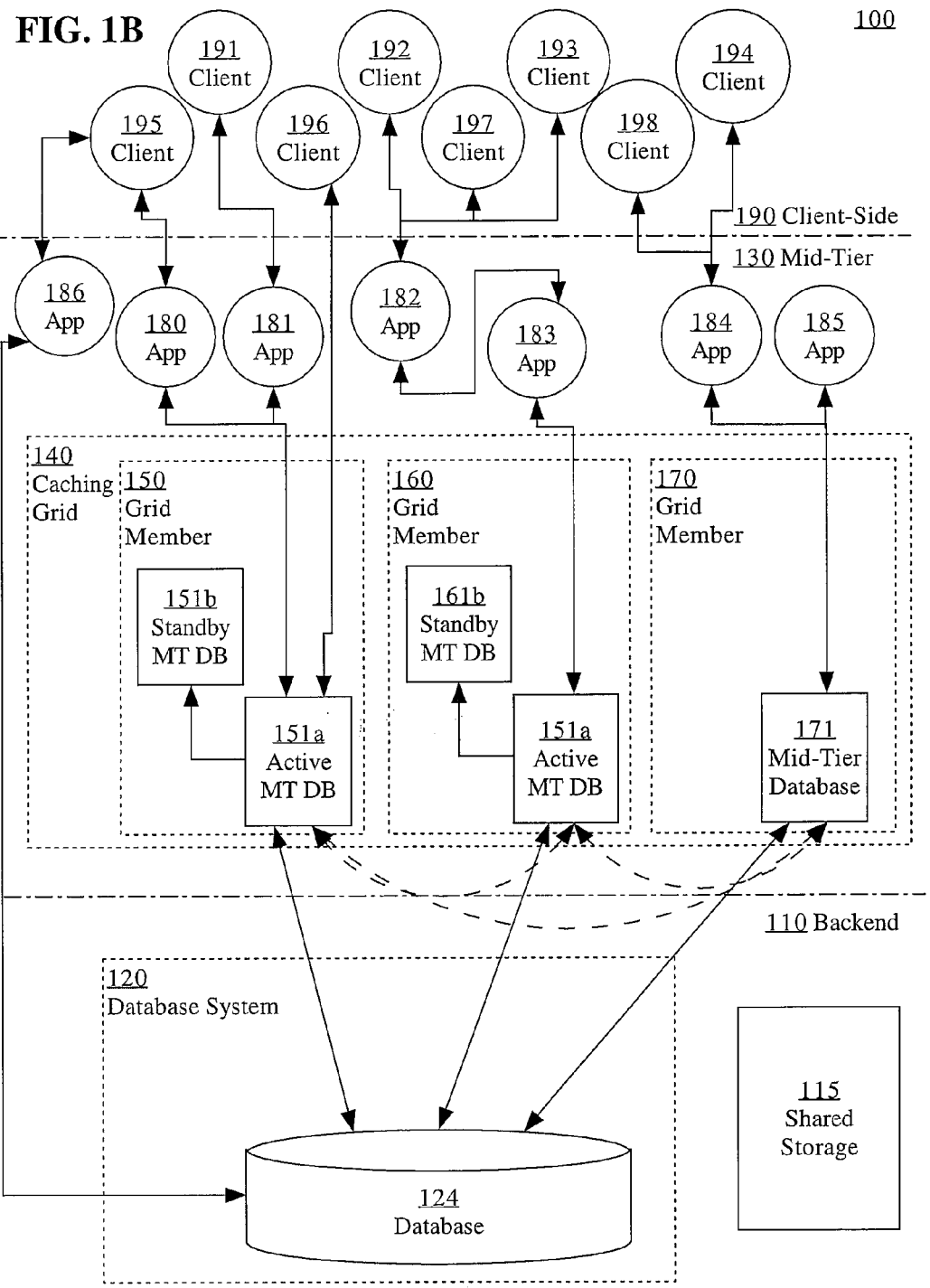

In some embodiments, grid members 150, 160, and 170 comprise multiple copies of the same mid-tier database—for example, an active copy implemented at a first node and an inactive copy implemented at another node. For example, FIG. 1B is a simplified block diagram of system 100 illustrating grid members 150 and 160 as comprising both active and standby copies of mid-tier databases 151 and 161, respectively. Specifically, grid member 150 comprises active database 151a and standby database 151b, while grid member 160 comprises active database 161a and standby database 161b. Changes made at each of active copies 151a and 161a are, synchronously or asynchronously, replicated at 151b and 161b via various means.

Accordingly, as used herein, the term "mid-tier database" may refer collectively to all copies of a mid-tier database in a grid member, unless the term is clearly being used to refer to a specific copy of the mid-tier database. For example, the process of changing data in a mid-tier database may be understood not only to refer to the changing of data in a single copy of the mid-tier database, but also to the process of changing data in an active copy of a mid-tier database and propagating those changes to the standby copy.

Returning now to FIG. 1A, some or all of the data items in mid-tier databases 151, 161, and 171 are cached copies or "cache instances" of elements from database 124. Each cache instance may take a variety of forms. For example, a cache instance may be a root tuple in a primary table and a set of related tuples in a child table. As another example, a cache instance may be a range of rows. As another example, a cache instance may be a range of data blocks. As another example, a cache instance may also be the result of running a specific query on the backend database.

Propagation To or From the Backend Database

Propagation agents 155, 165, and 175 are one or more background processes that propagate changes at mid-tier databases 151, 161, and 171 to backend database 124. Such processes may have, for example, been spawned when their corresponding mid-tier database was first initialized. Propagation may be achieved by a variety of means. For example, propagation agents 155, 165, and 175 may monitor transaction logs for mid-tier databases 151, 161, and 171, and then repeat those transactions at database 124. Note that, in some embodiments, it is assumed that any change to a cache instance in a mid-tier database is subsequently propagated via a component such as propagation agents 155, 165, and 175 to a backend database by any of a wide variety of means. However, the propagation need not occur immediately after a change is committed in the mid-tier grid. In fact, backend database 124 may go "offline" for periods of time, and be updated once it returns online.

Propagation agents 155, 165, and 175 may further ensure that changes in database 124 are periodically propagated to mid-tier databases 151, 161, and 171. In fact, in an embodiment, mid-tier database 151, 161, and 171 may be read-only databases that are periodically updated via propagation of transactions at the back-end database 124 to mid-tier databases 151, 161, and 171, thereby implementing a read-only mid-tier cache.

Cache Agents

In an embodiment, applications 152, 162, and 172 are presented with a transactionally consistent view of shared cache instances throughout the grid, in spite of being connected to different mid-tier databases. In an embodiment, transactional consistency is ensured by interaction with cache agents 156, 166, and 176 prior to applications 152, 162, and 172 writing and/or reading shared cache instances in mid-tier databases 151, 161, and 171. Cache agents 156, 166, and 176 are one or more processes that coordinate caching in mid-tier databases 151, 161, and 171, respectively, thereby causing databases 151, 161, and 171 to function collectively as caching grid 140.

In an embodiment, cache agents 156, 166, and 176 are one or more background processes that were started, for example, when their corresponding mid-tier databases 151, 161, or 171 was initialized. Applications 152, 162, and 172 may be configured to interact with these background processes prior to performing certain database operations. For example, applications 152, 162, and 172 may rely on an instruction library to perform various operations, and that instruction library may include instructions for communicating with cache agents 152, 162, and/or 172 prior to performing a transaction. In another embodiment, cache agents 156, 166, and 176 are temporary threads spawned whenever applications 152, 162, or 172 make certain calls via an API to the instruction library for performing various database operations. In this embodiment, cache agents 156, 166, and 176 are, essentially, implementations of instructions within the instruction library.

Cache agents 156, 166, and 176 may be consulted for a variety of purposes. For example, cache agents 156, 166, and 176 may be utilized to perform steps such as determining if data referenced in a request is defined as being cacheable, identifying a cache instance in which a referenced element is cached, determining whether a cache instance for a requested element is already in caching grid 140, loading into a mid-tier database 151, 161, or 171 cache instances for cacheable elements of database 124, determining an owner of a cache instance, moving a cache instance from one mid-tier database to another, and causing a mid-tier database to acquire ownership of a cache instance. Cache agents 156, 166, and 176 may also communicate with each other via, for instance, a distributed caching protocol to coordinate caching throughout grid 140.

In an embodiment, each application 152, 162, and 172 is configured to wait to perform write and/or read operations at the application's respective mid-tier database 151, 161, or 171 until the application's corresponding cache agent 156, 166, or 176 indicates that the respective mid-tier database 151, 161, or 171 has acquired ownership. In some embodiments, the acquisition of ownership involves the movement of a cache instance to the applications corresponding mid-tier database. For example, the cache agent at the formerly owning member may send the cache instance to the cache agent at the new owning member. Or, the cache agent at the formerly owning member may cause any changed data in the cache instance to be propagated to the backend database, and the cache agent at the new owning member may recreate the cache instance based on the appropriate data elements in the backend database.

According to an embodiment, propagation agents 155, 165, and 175 and cache agents 156, 166, and 176 may comprise one or more of the same implementing processes.

For convenience, grid members 150, 160, and 170 are described herein as performing many tasks that are actually performed by subcomponents such as propagation agents 155, 165, and 175 and cache agents 156, 166, and 176. Thus, any task described as being performed by a grid member should be understood as being performed by one or more processes executing at or in the grid member, such as a propagation agent or cache agent.

2.3. Cache Groups

According to an embodiment, elements in a database may be defined as being in the namespace for a mid-tier database, without the mid-tier database actually storing cache instances of those elements. In other words, a mid-tier database presents the illusion of holding certain pre-defined sets of data, even though those sets of data may only be stored elsewhere. However, when those sets of data are required, they may be loaded into the mid-tier database. For example, cache agent 156 may recognize a database command that references data within the namespace of a mid-tier database 151, but for which mid-tier database 151 presently stores no cache instance. In response to such a command, cache agent 156 may dynamically load a cache instance into mid-tier database 151 that corresponds to the referenced data. Cache agent 156 may then allow execution of the command.

One technique for accomplishing the above involves the use of metadata describing cache groups. Cache groups define which backend elements are to be cached in the mid-tier database, as well as the form in which they are to be cached (i.e. the structure of the cache instances). Cache groups provide not only a mechanism whereby a cache instance for a particular backend element may be located, but also a mechanism for defining for which elements cache instances are to be loaded into a mid-tier database should any non-stored elements be requested at the mid-tier database. An example implementation of cache groups is discussed in detail in "Database System with Dynamic Database Caching."

According to an embodiment, each cache group is associated with one or more elements from a backend database, such as a set of one or more tables or portions thereof. Any elements of the backend database associated with a cache group are inherently cacheable, and portions of those elements may be loaded into a mid-tier database as needed. In an embodiment, any given backend element may be defined as cacheable within only one cache group in a mid-tier database, thereby simplifying the process of determining where data for that element is cached.

A cache group defines a set of cache instances. Since these cache instances may or may not actually exist at the mid-tier database for which the cache group is defined, a cache group should be conceptualized as a set of defined cache instances, as opposed to a set of actual cache instances. Some defined cache instances may correspond to cache instances actually stored in a mid-tier database, while other defined cache instances correspond to cache instances that may be created and stored in a mid-tier database in the future. For each defined cache instance, the cache group identifies one or more elements from the backend database—for instace, subelements of the elements associated with the cache group—to which the defined cache instance is mapped.

A cache instance is defined, in part, by metadata specifying which data in the element(s) associated with the cache group should be cached. For example, for a cache group comprising two tables, metadata may specify that each cache instance should include values from a designated subset of columns in the two tables. A cache instance is further defined by a unique identifier. Cache instance identifiers may be defined explicitly in, for example, a table mapping cache instance identifiers to backend elements. Or, these identifiers may be defined implicitly, through an algorithm for determining a cache instance identifier for any given backend element. For example, one such algorithm may be to designate a certain unique column—e.g. a primary key—in each associated backend element as the cache instance identifier.

2.4. Shared Cache Groups

According to an embodiment, certain cache groups in a mid-tier database may specified on a global, grid-wide scale. In other words, certain cache groups may be designated as "shared" cache groups. The consistency of cache instances defined by a shared cache group may be guaranteed throughout the grid by a variety of locking mechanisms, including the ownership metadata discussed subsequently herein. Metadata defining shared cache groups may be maintained at each mid-tier database, or in a shared storage area such as shared storage space 115. In the former case, copies of metadata defining the shared cache groups may be kept synchronized by, for example, pier-to-pier communication between cache agents. Shared cache groups ensure that data is cached in the same form throughout the entire grid, thereby making it possible for any grid member to predict, for any given backend data, a cache instance identifier by which another grid member would store a cache instance for that backend data.

Figure 2:
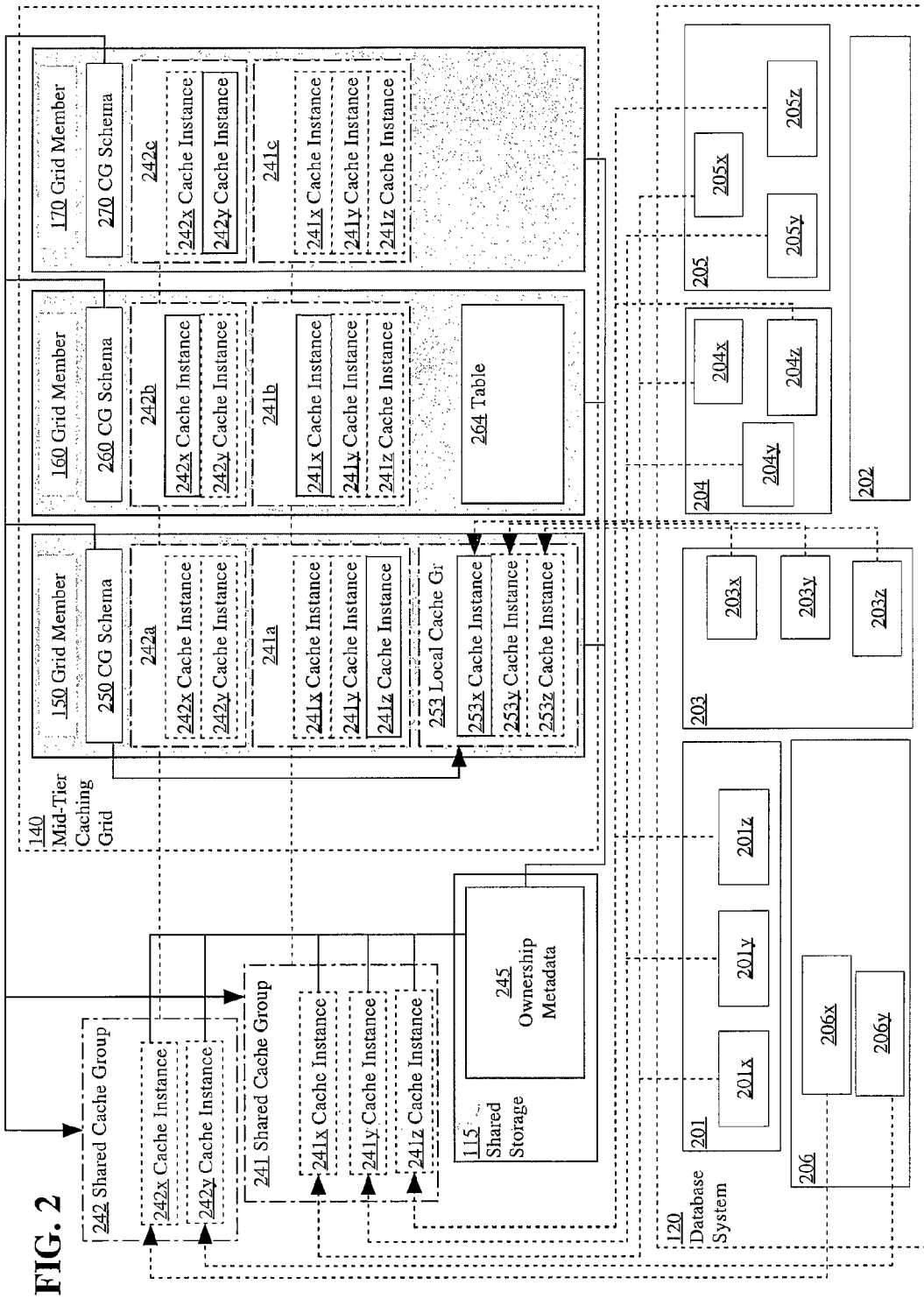
FIG. 2 is a block diagram illustrating the use of shared cache groups.

FIG. 2 is a block diagram illustrating the use of shared cache groups in system 100 according to an embodiment of the invention. For simplicity, various components of system 100 have been omitted in FIG. 2. For example, FIG. 2 depicts data elements as being stored generally in database system 120, and cache instances as being more generally stored in grid members 150, 160, and 170. FIG. 2 depicts but one example implementation of cache groups. Other implementations may rely upon more or fewer components in different arrangements.

As depicted in FIG. 2, backend database system 120 comprises a number of different elements 201-206. Meanwhile, mid-tier grid 140 comprises a shared cache group 241 and shared cache group 242. Shared cache groups 241 and 242 are represented conceptually at each grid member by cache groups 241a-241c and 242a-242c. Additionally, grid member 150 comprises a local cache group 253, while grid member 160 comprises an unrelated table 264.

Metadata in system 100—for example, cache group schemas 250, 260, and 270 at members 150, 160, and 170, respectively—maps shared cache group 241 to elements 201, 204, and 205 in database system 120. Elements 201, 204 and 205 may each be, for example, database objects such as tables or table portions. That same metadata maps shared cache group 242 to element 203 in database system 120. Meanwhile, metadata located at grid member 150 maps cache group 253 to element 206. Element 202 of database system 120 is not mapped to any cache group.

This same metadata in system 100 defines cache instances inside each of cache groups 241, 242, and 253. For example, cache instances 241x-241z are defined for cache group 241, cache instances 242x-242y are defined for cache group 242, and cache instances 253x-253z are defined for cache group 253. Each defined cache instance is mapped to one or more elements from database system—for instance, a subset of data from the element(s) mapped to the cache group defining the cache instance. For example, for a cache group that is mapped to a set of tables, each cache instance may map to a set of associated rows in the set of tables. As depicted in FIG. 2, cache instance 241x maps to the set of subelements 201x, 204x, and 205x, cache instance 241y maps to the set of subelements 201y, 204y, and 205y, and cache instance 241z maps to the set of subelements 201z, 204z, and 205z. Meanwhile, cache instances 242x and 242y map to subelements 203x and 203y, respectively. Finally, cache instances 253x-253z map to subelements 206x-206z, respectively.

Although cache instances 241x-241z and 242x-242y are defined for each grid member 150, 160 and 170, each grid member does not store each cache instance 241x-241z and 242x-242y. Rather, for any given grid member 150, 160, or 170, only the cache instances depicted with a solid border are actually stored at that grid member. Thus, grid member 150 stores cache instance 241z and 253x, grid member 160 stores cache instances 241x and 242x, and grid member 170 stores cache instance 242y. Cache instances 241y, 253y, and 253z are not stored at all within grid 140. However, each defined cache instance that is not stored at a grid member 150, 160, 170 may be loaded into grid members 150, 160, or 170 in response to a request at grid member 150, 160, or 170 for backend data corresponding to the defined cache instance.

Ownership Metadata

As mentioned above, shared cache groups 241 and 242 indicate which data in database system 120 is defined as cacheable. According to an embodiment, prior to performing a database operation that requires access to data that is defined as cacheable, grid members 150, 160, and 170 are configured to determine an owner of the cache instance defined for the data. An ownership determination may occur, for instance, based on communications between grid members. Or, each grid member may be configured to consult ownership information such as ownership metadata 245 in shared storage 115. Ownership metadata 245 maps each cache instance by identifier to a grid member 150, 160, or 170. Depending on the ownership information, grid members 150, 160, and 170 may be required to perform certain actions before allowing a database operation to proceed.

For example, if a particular grid member requires a particular cache instance that is not mapped to any grid member, the particular grid member may load that cache instance and update ownership metadata 245 to identify the particular member as owner of the particular cache instance. If the particular cache instance is already stored at another grid member, the particular grid member may cause the other grid member to relinquish ownership of the particular cache instance by, for example, flushing the particular cache instance to database system 120. The particular grid member may then load the particular cache instance and assume ownership.

In an embodiment, any time a grid member unloads a cache instance—e.g., through an aging algorithm—the grid member updates the ownership metadata 245 to indicate that the grid member is no longer owner of that cache instance.

In an embodiment, a grid member's ownership of a cache instance may be implied by virtue of the cache instance residing at the grid member. Thus, for example, grid member 150 would not be required to consult ownership information for cache instances 241z and 253x.

In an embodiment, cache instances are not removed from a previous owner. In this manner, a previous owner may still permit certain operations to occur with respect to the cache instances (e.g. a read operation). However, ownership metadata 245 must be consulted prior to performing other operations, such as write operations, so as to avoid overwriting changes made at another mid-tier database. Additionally, such embodiments may feature other levels of locking as well as inter-grid synchronization mechanisms so as to ensure that cache instances at a previous owner reflect any changes made by the new owner. For example, changes made to a copy of a cache instance at the owning mid-tier database may be replicated to other mid-tier databases comprising other copies of the cache instance. Or, for example, changes made to a copy of a cache instance at the owning mid-tier database may invalidate other copies of the cache instance at other mid-tier databases.

According to an embodiment, ownership metadata is never checked for cache instances that are not shared. For example, grid member 150 would not consult ownership metadata 245 prior to database operations concerning local cache group 253. Rather, grid member 150 would be allowed to load new cache instances and read/write to stored cache instances without consideration of whether element 206 is cached elsewhere in the mid-tier.

According to an embodiment, ownership metadata 245 is distributed across multiple grid members instead of being stored in shared storage 115. For example, ownership metadata may be distributed across multiple grid members in accordance with a hashing function based on a unique identifier for each cache instance. Or, as another example, distribution may instead be accomplished based on ranges of the unique identifier. The distribution mechanism is common to all grid members, and thus every grid member can predict the grid member that is currently holding the ownership metadata for any particular cache instance. A grid member can then obtain any required ownership metadata for a cache instance by communicating with the appropriate grid member.

3.0. Functional Overview 3.1. Example Implementation

Figure 3:
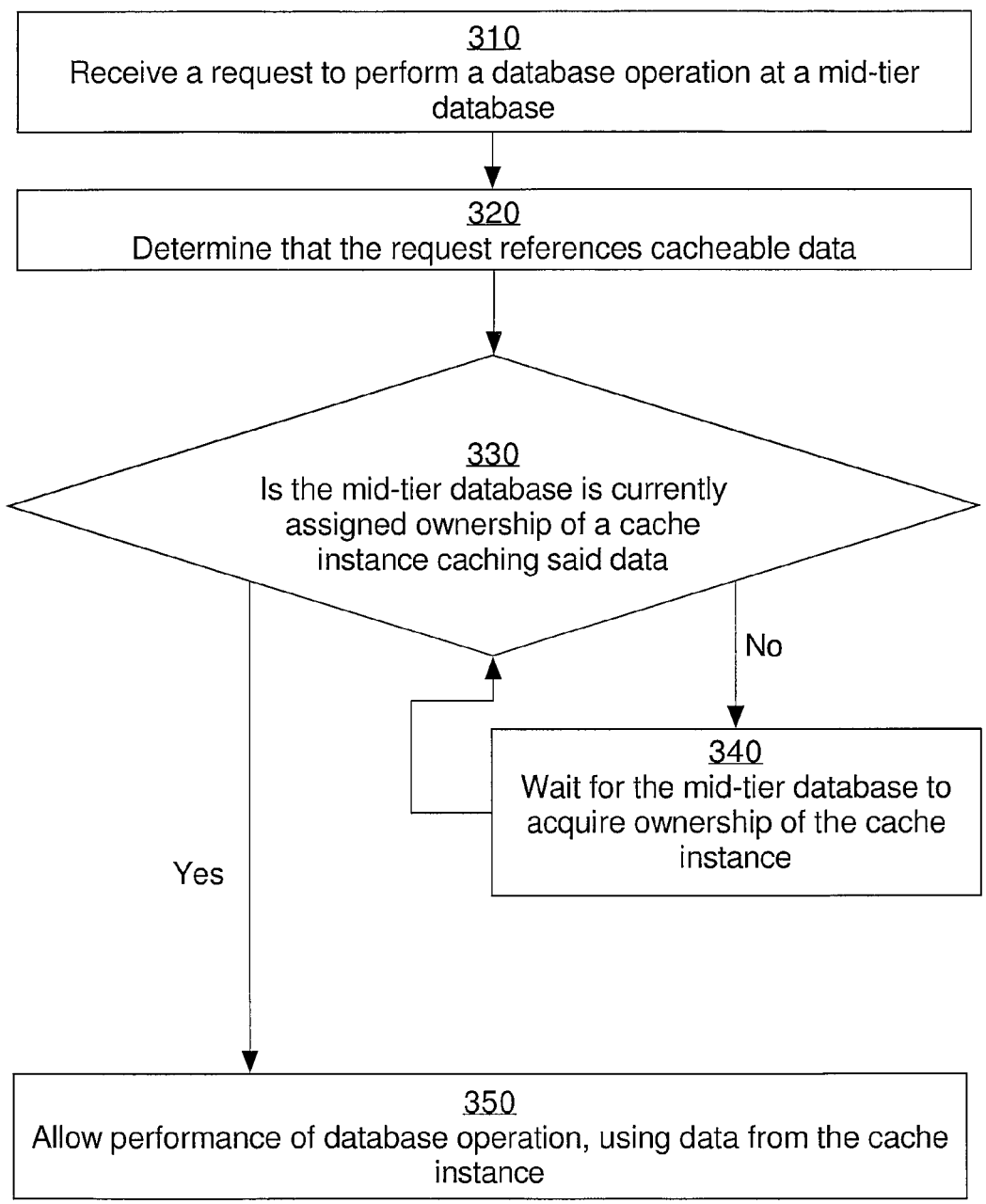
FIG. 3 is a flow chart illustrating a method for implementing a caching grid in the mid-tier.

FIG. 3 is a flow chart 300 illustrating a method for implementing a caching grid in the mid-tier, according to an embodiment of the invention. The illustrated method is but one example of a technique for implementing a caching grid. Other techniques may feature more or fewer steps, in different arrangements.

At step 310, a grid member receives a request to perform a database operation at its mid-tier database. For example, cache agent 156 may receive a request from application 152 to perform a database operation at mid-tier database 151. The request references one or more elements stored in a backend database. For example, the request may be a request to modify a data value in a specific row of a table in backend database 124. In an embodiment, the request is a request to write to the referenced elements. In other embodiments, the request may be any type of request that references the one or more elements.

At step 320, the grid member determines that the request of step 310 references cacheable data—that is to say, the grid member determines that a cache instance is defined for the referenced data. For example, cache agent 156 may consult cache group schema 250 and determine that the requested data belongs to an element that is mapped to a shared cache group. Further based on schema 250, cache agent 156 may determine an identifier for the cache instance defined to cache the referenced data.

At step 330, the grid member determines whether the mid-tier database is currently assigned ownership of the cache instance. For example, cache agent 156 may attempt to lookup the cache instance identifier in ownership metadata 245.

If the grid member determined in step 330 that the mid-tier database is not assigned ownership, then flow continues with step 340. At step 340, the grid member waits for the mid-tier database to acquire ownership. In an embodiment, while waiting in step 340, the grid member takes certain measures to cause the mid-tier database to acquire ownership, such as forcing another mid-tier database in the caching grid to relinquish ownership of the cache instance and/or loading the cache instance into the mid-tier database.

For example, if the requested data was from element 204x, cache agent 156 would instruct cache agent 166 to release mid-tier database 161's ownership of cache instance 241x. Cache agent 166 may comply by, for example, committing any uncommitted changes to cache instance 241x and communicating cache instance 241x to cache agent 156. Cache agent 166 may also or instead comply by modifying ownership metadata 245 to indicate that mid-tier database 161 no longer owns cache instance 241x. Once cache agent 166 has taken these actions, cache agent 156 may load cache instance 241x at mid-tier database 151. Cache agent 156 may also update ownership metadata 245 to indicate mid-tier database 151 as owning cache instance 241x.

If the grid member determined in step 330 that the mid-tier database is assigned ownership, or upon completion of step 340, then flow continues to step 350. At step 350, the grid member allows the requested database operation to be performed. In an embodiment, step 350 may entail allowing the application that sent the request to go ahead and perform the database operation. In an embodiment, the cache agent may assume responsibility for instigating performance of the database operation. In an embodiment, step 350 may require translation of the requested database operation so as to reference the cache instance as opposed to data in the backend database (and may further require re-translating any results).

Figure 4:
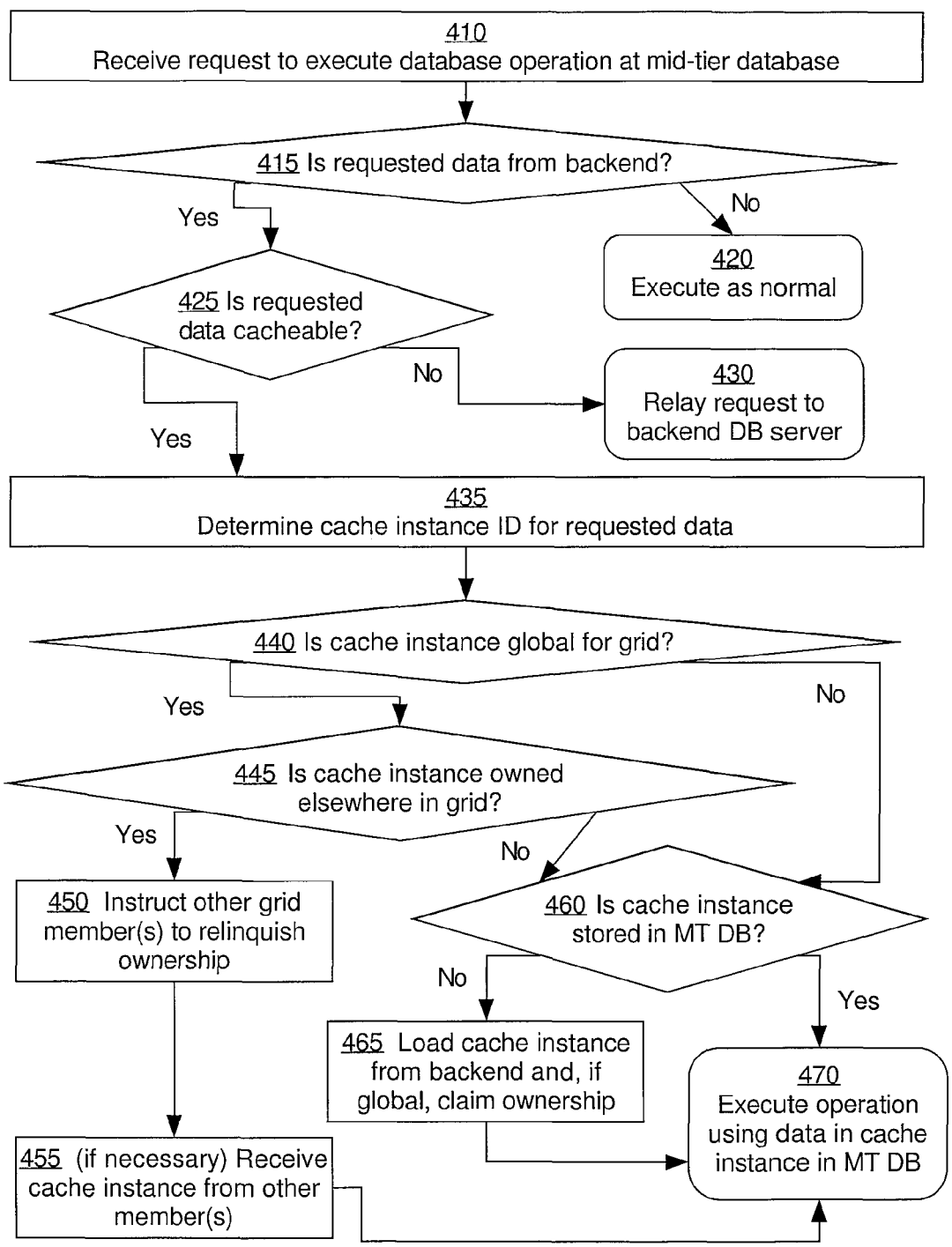
FIG. 4 is a flow chart that illustrates a method for handling requests at a mid-tier database that comprises not only shared cache instances, but also local cache instances and other data.

3.2. Differentiating Between Data in a Shared Cache Group and Other Data in a Mid-Tier Database FIG. 4 is a flow chart 400 that illustrates a method for handling requests at a mid-tier database that comprises not only shared cache instances, but also local cache instances and other data, according to an embodiment. The illustrated method is but one example of a technique for implementing a caching grid. Other techniques may feature more or fewer steps, in different arrangements At step 410, like in step 310, a grid member of the mid-tier caching grid receives a request to perform a database operation at the member's mid-tier database.

At step 415, the grid member determines whether elements referenced in the request are locally originated database objects or database objects originating from a backend database. For example, in response to a request, cache agent 166 might determine whether the request refers to data that originated from locally maintained table 264, or to data originating from an object in backend database 124. In an embodiment, an element stored in a mid-tier database is determined to be local if it exists in the mid-tier database and is not associated with any cache group or cache instance.

At step 420, if the referenced elements are local in origin, the operation is performed in normal fashion. Otherwise, flow proceeds to step 425.

At step 425, the grid member determines whether the elements referenced in the backend database are defined to be cacheable. This determination may entail, for example, determining whether the elements are associated with, or are sub-elements of an element associated with, a cache group.

If, at step 425, the grid member determines that a requested element is not cacheable, then at step 430, the grid member relays the request to the backend database server. For example, suppose cache agent 176 received a SQL select statement for rows in element 202 of backend database 124. Cache agent 176 would determine, in step 425, that element 202 of database 124 is not cacheable. Accordingly, cache agent 176 would send the SQL select statement to database server 122 for processing. This technique is referred to as "SQL passthrough."

However, if at step 425 the grid member determines that the requested elements are cacheable, then at step 435, the grid member determines an identifier of a cache instance defined for the requested elements. This determination may be based on, for instance, metadata describing the cache group with which the referenced elements are associated.

At step 440, the grid member determines whether the requested elements are cacheable at the grid level (e.g. in a shared cache instance), or cacheable only at a local level. For example, this determination may entail determining whether the cache group associated with the requested elements—or associated with elements to which the requested elements belong—is local, such as cache group 253, or shared, such as cache groups 241 and 242. If the requested elements are cacheable only locally, flow proceeds to step 460. Otherwise, flow proceeds to step 445.

At step 445, the grid member determines whether the identified cache instance is owned by any other member of the grid. For example, cache agent 166 may consult ownership metadata 245 to determine if cache instance 242y is owned by a grid member other than grid 160. If the cache instance is owned by another grid member, flow proceeds to step 450. Otherwise, flow proceeds to step 460.

At step 450, the grid member instructs the owning member to relinquish ownership of the identified cache instance. For example, cache agent 166 may instruct cache agent 176 to relinquish grid member 170's ownership of cache instance 242y. Cache agent 176 may do so by causing any uncommitted changes to cache instance 242y to be committed. Cache agent 176 may then update ownership metadata 245 to indicate that grid member 170 no longer owns cache instance 242y.

At step 455, if the grid member does not already have the latest version of the cache instance, the grid member receives the identified cache instance from the other grid member. The cache instance may be transferred, for instance, between cache agents at the grid members via an inter-grid communications link and using an inter-grid protocol. At the same time, the grid member updates ownership data to indicate that the identified cache instance is now owned by the grid member. Flow then proceeds to step 470.

At step 460, the grid member determines if the identified cache instance is already stored at the grid member. If so, flow proceeds to step 470, otherwise, flow proceeds to step 465.

At step 465, the grid member creates the identified cache instance and stores it in the grid member's mid-tier database. At the same time, if the cache instance was global, the grid member updates ownership data to indicate that the identified cache instance is owned by the grid member.

At step 470, like in step 350, the grid member allows the requested database operation to be performed at the mid-tier database.

3.3. Simplified Method for Embodiments with Implied Ownership

Figure 5:
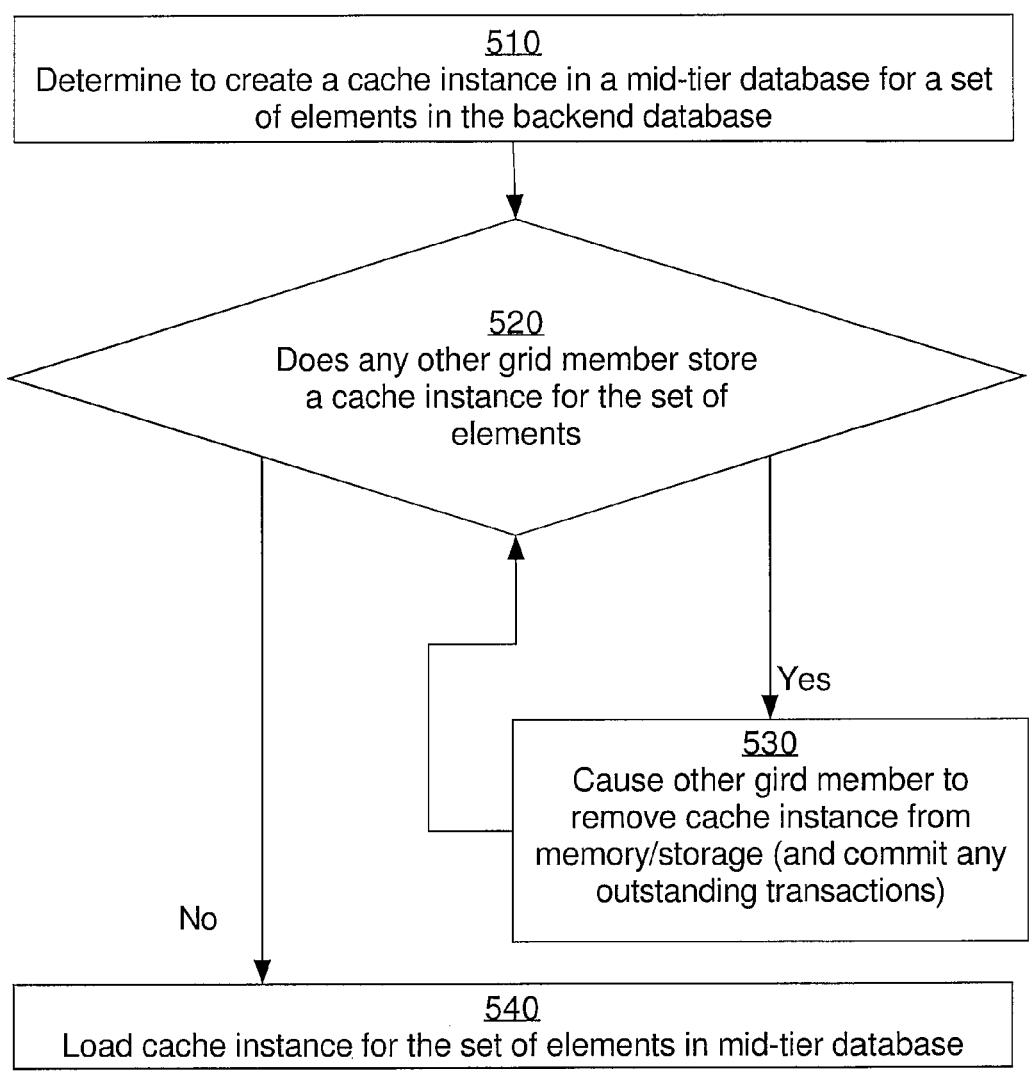
FIG. 5 is a flow chart illustrating a simplified method for maintaining cache consistency at the grid-level for certain embodiments in which ownership of a cache instance is implied by virtue of the mid-tier database storing the cache instance.

FIG. 5 is a flow chart 500 illustrating a simplified method for maintaining cache consistency at the grid-level for certain embodiments in which ownership of a cache instance is implied by virtue of a mid-tier database storing the cache instance. The illustrated method is but one example of a technique for implementing a caching grid. Other techniques may feature more or fewer steps, in different arrangements.

Generally, a grid member in embodiments implementing flow chart 500 will always assume that it has ownership of a cache instance if that cache instance is stored locally. Thus, the grid member only needs to employ steps for maintaining the consistency of the cache grid when the grid member does not store a cache instance in its mid-tier database.

At step 510, a grid member determines that it needs to create a cache instance in its mid-tier database for a set of elements in the backend database. At step 520, the grid member determines whether any other grid member node stores a cache instance for the set of elements. If not, flow proceeds to step 540. Otherwise, at step 530, the grid member causes the other grid member to remove the cache instance from its mid-tier database. Before completion of step 530, the other grid member ensures that any transactions involving the cache instance have been committed to the grid. Once the cache instance has been removed from the other grid member's database, flow proceeds to step 540. At step 540, the grid member loads a cache instance at its mid-tier database for the set of elements. For example, the grid member may receive the cache instance from the other grid member. Or, the grid member may load the cache instance from the backend database.

FIG. 5 assumes that the cache instance is a shared cache instance. Other embodiments may include a step such as step 440 for determining whether the cache instance is a shared cache instance. Note that FIG. 5 implies that all operations, regardless of whether they involve changes to data, require ownership of cache instance.

4.0. Other Example Implementation Details 4.1. Creating/Adding to a Grid

According to an embodiment, a grid may be created by starting a cache agent in association with each mid-tier database in the grid. The cache agent may utilize configuration metadata at, for example, shared storage 115 to identify the location of resources such as the backend database, ownership metadata, other grid members, and shared cache group specifications. Alternatively, some or all of this information may be configured by a user interacting with each cache agent over a user interface. For example, an administrator may use DDL commands to specify some or all of the necessary configuration information.

In an embodiment, some or all of the configuration information may be propagated from one cache agent to another, thereby avoiding the need for an administrator to configure each grid member separately. For example, a shared cache group may be specified at a first node, and the first node may then announce the shared cache group to any other accessible nodes that are executing a cache agent.

In an embodiment, cache agents may automatically look for and/or announce their existence to other cache agents via, for example, broadcast messages over a network. Once a cache agent locates another agent, the cache agents may communicate with each other to establish or expand the grid. In this manner, for instance, cache agents may be added to an already existing grid while the grid is online, without bringing the grid down.

In an embodiment, when a cache agent is started, if it is the first cache agent in the grid, the cache agent starts other cache agents in association with other mid-tier databases designated as being in the grid.

In an embodiment, when a new member is added to the grid, distributed ownership metadata for the grid is reorganized. Ownership metadata for certain cache instances may be assigned to the new member so as to distribute the ownership metadata more evenly throughout the grid. Redistribution may be accomplished, for instance, via a hash function or range partitioning based on cache instance identifiers.

4.2. High Availability

According to an embodiment, the grid continues to function even when a grid member fails. Should a mid-tier database fail while storing shared cache instances, the shared cache instances may be recovered via any of a variety of recovery techniques, including transaction logs maintained at a shared storage. Recovery may be initiated, for example, when a functioning cache agent attempts to contact a failed cache agent to obtain ownership of a cache instance mapped to the failed mid-tier database. Or, recovery may be initiated by the failed cache agent, should it return to the grid. Or, recovery may be initiated by various other processes monitoring the failed mid-tier database, such as a cluster manager. Recovery may entail updating the backend database to reflect any unpropagated transaction and/or rebuilding the failed mid-tier database. Once recovery is completed for a particular cache instance, ownership of the particular cache instance may be reassigned to any grid member that requires the particular cache instance.

In embodiments comprising distributed ownership metadata, further recovery efforts may be taken to recover any lost ownership metadata. However, if the ownership metadata cannot be recovered, grid members may voluntarily relinquish ownership of any cache instances for which the ownership metadata was lost. In any event, should the failed member not come back online within a certain period of time, the ownership metadata should be redistributed as explained above.

According to an embodiment, for each mid-tier database, there is an active copy and a standby copy. If the active copy should fail, the standby copy transparently replaces the active copy, and the mid-tier database is retained in the grid.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
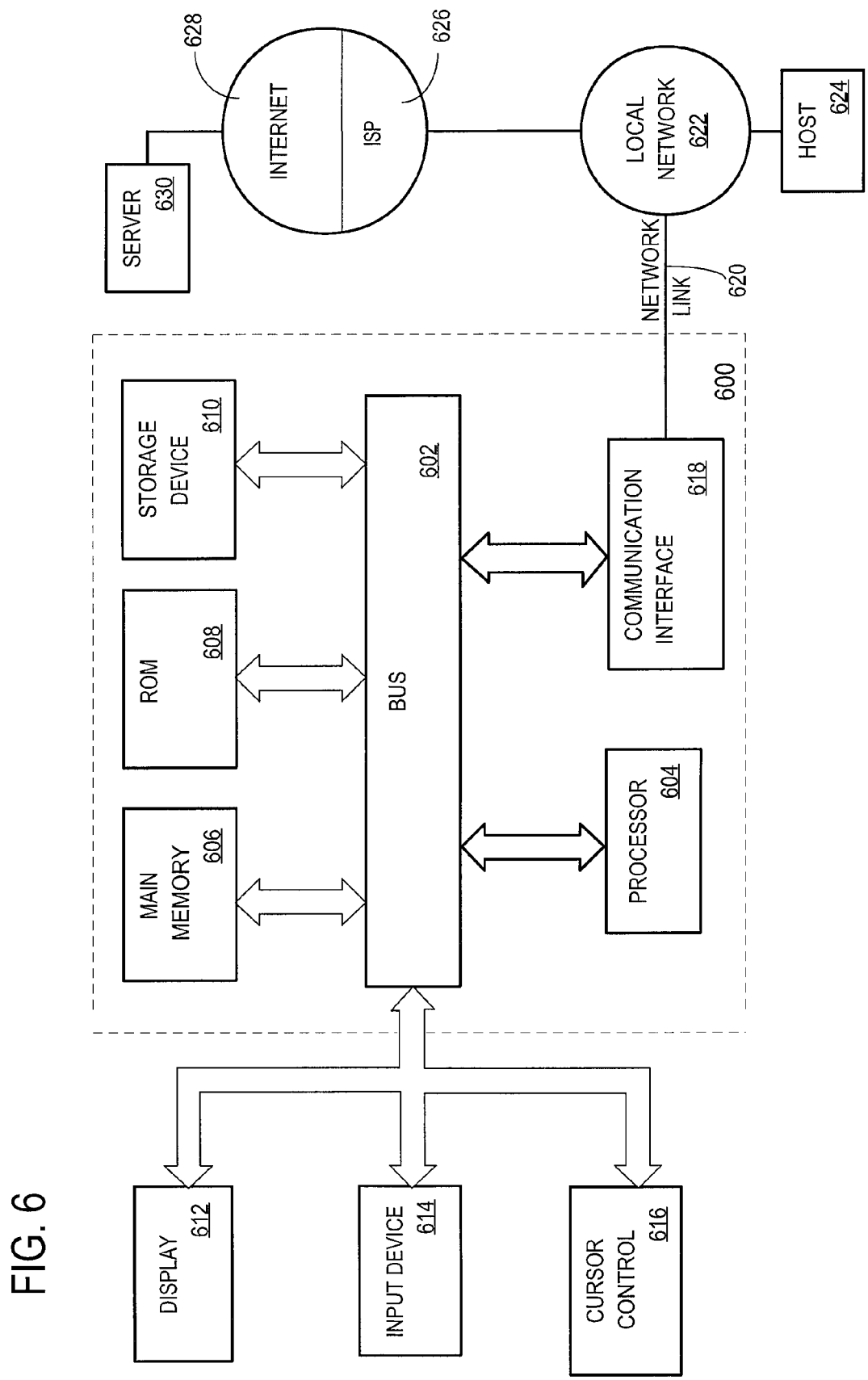
FIG. 6 is block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   maintaining a grid of mid-tier databases storing cache instances of elements from one or more backend data sources, wherein changes to said cache instances are propagated back to the one or more backend data sources;
   receiving requests to change data in a particular mid-tier database, said data belonging to particular elements in the one or more backend data sources;
   in response to each particular request of the requests:
      identifying a particular cache instance mapped to particular data indicated by the particular request;
      determining ownership information for the particular cache instance, wherein the ownership information indicates either: a) a mid-tier database to which the particular cache instance has been exclusively assigned, or b) that the particular cache instance is not yet stored in the grid; and
      waiting to change the particular data in the particular mid-tier database at least until the ownership information indicates that the particular database has exclusive ownership of the particular cache instance;
   wherein, for at least some particular requests of the requests, the ownership information is updated to indicate that the particular mid-tier database has been assigned exclusive ownership upon at least:
      determining that another mid-tier database in the grid stores the particular cache instance;
      causing any pending transactions relating to the particular cache instance at the other mid-tier database to be committed;
      transmitting the particular cache instance from the other mid-tier database to the particular mid-tier database;
   wherein the method is performed by one or more computing devices implementing the grid.

2. The method of claim 1, wherein, for any given element at any given time, the grid of mid-tier databases stores only a single cache instance corresponding to the element, wherein determining ownership information comprises determining if the particular mid-tier database stores the particular cache instance.

3. The method of claim 1, wherein determining the ownership information comprises accessing shared ownership metadata mapping said cache instances to said mid-tier databases.

4. The method of claim 1, wherein the mid-tier databases are relational databases.

5. The method of claim 1,
   wherein access to the one or more backend data sources is provided by a database server;
   wherein said database server is configured to respond to database statements pertaining to data in the one or more backend data sources from multiple clients, the multiple clients including at least one client executing at a computing device that does not implement the mid-tier database;
   wherein said database server does not provide access to said mid-tier databases;
   wherein the request to change data in the mid-tier database is a database statement.

6. The method of claim 1, further comprising:
   maintaining metadata defining one or more shared cache groups, the one or more shared cache groups comprising said cache instances;

wherein the metadata indicates that at any given time, the grid should maintain only a single consistent version of each of said cache instances;
wherein the particular mid-tier database stores one or more cache instances that are not in the one or more shared cache groups;
receiving a second request to change second data in the particular mid-tier database, said second data belonging to a second particular element in the one or more backend data sources;
based on said metadata, determining that the second particular element does not pertain to any of the one or more shared cache groups, and therefore changing a second cache instance corresponding to the second particular element without any determination of exclusive ownership.

7. The method of claim 6,
wherein each of the one or more shared cache groups is mapped to a different set of one or more tables in the one or more backend data sources;
wherein no table in the one or more backend data sources is mapped to more than one of the one or more shared cache groups;
wherein each cache instance of said cache instances maps to a different set of one or more associated rows or row portions in a corresponding set of one or more tables.

8. The method of claim 6, further comprising:
determining whether the particular cache instance belongs to any of the one or more shared cache groups; and
waiting to change the particular data only when the metadata indicates that the particular cache instance belongs to at least one of the one or more shared cache group.

9. The method of claim 1, wherein the one or more computing devices store an active copy of the particular mid-tier database and a standby copy of the particular mid-tier database, wherein upon failure of the active copy of the particular mid-tier database, the standby copy of the particular mid-tier database retains ownership of any cache instances assigned to the particular mid-tier database.

10. The method of claim 1, wherein each mid-tier database is stored in a volatile memory at the one or more computing devices.

11. The method of claim 1, wherein, at the time of a first request of the requests, a first cache instance is stored at both the particular mid-tier database and a second mid-tier database, the method further comprising, in response to the first request, updating the ownership information to indicate that the particular mid-tier database owns the particular cache instance.

12. The method of claim 11, further comprising:
reading data from cache instances at the particular mid-tier database without the ownership information indicating that the particular mid-tier database owns the cache instances.

13. The method of claim 1, further comprising propagating changes in the backend data source to the plurality of mid-tier databases.

14. A method comprising:
maintaining a grid of mid-tier databases storing cache instances of elements from one or more one or more backend data sources, wherein changes to said cache instances are propagated back to the one or more backend data sources;
receiving a request to change data in a particular mid-tier database, said data belonging to a particular element in the one or more backend data sources;
in response to the request:
determining whether the particular mid-tier database stores a particular cache instance corresponding to the particular element;
responsive to determining that the particular mid-tier database stores the particular cache instance corresponding to the particular element:
determining that the particular mid-tier database has been assigned exclusive ownership of the particular cache instance;
responsive to determining that the particular mid-tier database does not store the particular cache instance corresponding to the particular element:
determining whether any other mid-tier database in the grid stores the particular cache instance corresponding to the particular element;
responsive to determining that an other mid-tier database stores the particular cache instance corresponding to the particular element:
causing any pending transactions relating to the particular cache instance at the other mid-tier database to be committed;
moving the particular cache instance from the other mid-tier database to the particular mid-tier database;
responsive to determining that no other mid-tier database stores the particular cache instance corresponding to the particular element:
generating the particular cache instance for the particular element;
storing the particular cache instance at the particular mid-tier database;
upon storing the particular cache instance at the particular mid-tier database, determining that the particular mid-tier database has been assigned exclusive ownership of the particular cache instance;
changing the data in the particular mid-tier database upon determining that the particular database has been assigned exclusive ownership of the particular cache instance;
wherein the method is performed by one or more computing devices implementing the grid.

15. A system comprising:
one or more backend data sources stored in at least one persistent storage device;
a backend server executing at a first set of one or more computing devices, the backend server being configured to provide access to the one or more backend data sources;
a plurality of mid-tier databases stored at a second set of one or more computing devices;
one or more processes executing at the second set of computing devices, the one or more processes configured to maintain, in the plurality of mid-tier databases, a caching grid, said caching grid comprising at least a plurality of shared cache instances of data from the one or more backend data sources;
wherein the plurality of shared cache instances are stored in the plurality of mid-tier databases;
wherein the one or more processes ensure that for any given data element of the one or more backend data sources for which the caching grid maintains a shared cache instance, the plurality of mid-tier databases store, at any given time, no more than one version of the shared cache instance;
wherein the second set of one or more computing devices are configured to:

receive requests to change data in a particular mid-tier database, said data belonging to particular elements in the one or more backend data sources;
in response to each particular request of the requests:
identify a particular cache instance mapped to particular data indicated by the particular request;
determine ownership information for the particular cache instance, wherein the ownership information indicates either: a) a mid-tier database to which the particular cache instance has been exclusively assigned, or b) that the particular cache instance is not yet stored in the grid; and
wait to change the particular data in the particular mid-tier database at least until the ownership information indicates that the particular database has exclusive ownership of the particular cache instance;
wherein, for at least some particular requests of the requests, the ownership information is updated to indicate that the particular mid-tier database has been assigned exclusive ownership upon at least:
determining that another mid-tier database in the grid stores the particular cache instance;
causing any pending transactions relating to the particular cache instance at the other mid-tier database to be committed;
transmitting the particular cache instance from the other mid-tier database to the particular mid-tier database.

16. The system of claim 15, wherein the one or more processes are further configured to maintain the caching grid in an online state even after the failure of one or more of the plurality of mid-tier databases.

17. The system of claim 15:
wherein the one or more processes maintain metadata defining shared cache groups that collectively form the caching grid, the shared cache groups comprising the plurality of shared cache instances, wherein the metadata indicates that at any given time, the caching grid should maintain only a single consistent version of each shared cache instance in the plurality of shared cache instances.

18. One or more storage media storing instructions which, when executed by one or more computing devices, cause performance of:
maintaining a grid of mid-tier databases storing cache instances of elements from one or more backend data sources, wherein changes to said cache instances are propagated back to the one or more backend data sources;
receiving requests to change data in a particular mid-tier database, said data belonging to particular elements in the one or more backend data sources;
in response to each particular request of the requests:
identifying a particular cache instance mapped to particular data indicated by the particular request;
determining ownership information for the particular cache instance, wherein the ownership information indicates either: a) a mid-tier database to which the particular cache instance has been exclusively assigned, or b) that the particular cache instance is not yet stored in the grid; and
waiting to change the particular data in the particular mid-tier database at least until the ownership information indicates that the particular database has exclusive ownership of the particular cache instance;
wherein, for at least some particular requests of the requests, the ownership information is updated to indicate that the particular mid-tier database has been assigned exclusive ownership upon at least:
determining that another mid-tier database in the grid stores the particular cache instance;
causing any pending transactions relating to the particular cache instance at the other mid-tier database to be committed;
transmitting the particular cache instance from the other mid-tier database to the particular mid-tier database.

19. The one or more storage media of claim 18, wherein, for any given element at any given time, the grid of mid-tier databases stores only a single cache instance corresponding to the element, wherein determining ownership information comprises determining if the particular mid-tier database stores the particular cache instance.

20. The one or more storage media of claim 18, wherein determining the ownership information comprises accessing shared ownership metadata mapping said cache instances to said mid-tier databases.

21. The one or more storage media of claim 18, wherein the mid-tier databases are relational databases.

22. The one or more storage media of claim 18,
wherein access to the one or more backend data sources is provided by a database server;
wherein said database server is configured to respond to database statements pertaining to data in the one or more backend data sources from multiple clients, the multiple clients including at least one client executing at a computing device that does not implement the mid-tier database;
wherein said database server does not provide access to said mid-tier databases;
wherein the request to change data in the mid-tier database is a database statement.

23. The one or more storage media of claim 18, wherein the instructions, when executed by one or more computing devices, further cause performance of:
maintaining metadata defining one or more shared cache groups, the one or more shared cache groups comprising said cache instances;
wherein the metadata indicates that at any given time, the grid should maintain only a single consistent version of each of said cache instances;
wherein the particular mid-tier database stores one or more cache instances that are not in the one or more shared cache groups;
receiving a second request to change second data in the particular mid-tier database, said second data belonging to a second particular element in the one or more backend data sources;
based on said metadata, determining that the second particular element does not pertain to any of the one or more shared cache groups, and therefore changing a second cache instance corresponding to the second particular element without any determination of exclusive ownership.

24. The one or more storage media of claim 23,
wherein each of the one or more shared cache groups is mapped to a different set of one or more tables in the one or more backend data sources;
wherein no table in the one or more backend data sources is mapped to more than one of the one or more shared cache groups;
wherein each cache instance of said cache instances maps to a different set of one or more associated rows or row portions in a corresponding set of one or more tables.

25. The one or more storage media of claim 18, wherein the one or more computing devices store an active copy of the particular mid-tier database and a standby copy of the particular mid-tier database, wherein upon failure of the active copy of the particular mid-tier database, the standby copy of the particular mid-tier database retains ownership of any cache instances assigned to the particular mid-tier database.

26. The one or more storage media of claim 18, wherein each mid-tier database is stored in a volatile memory at the one or more computing devices.

27. The one or more storage media of claim 18, wherein, at the time of a first request of the requests, a first cache instance is stored at both the particular mid-tier database and a second mid-tier database, the method further comprising, in response to the first request, updating the ownership information to indicate that the particular mid-tier database owns the particular cache instance.

28. The one or more storage media of claim 27, wherein the instructions, when executed by one or more computing devices, further cause performance of:
    reading data from cache instances at the particular mid-tier database without the ownership information indicating that the particular mid-tier database owns the cache instances.

29. The one or more storage media of claim 27, wherein the instructions, when executed by one or more computing devices, further cause performance of:
    determining whether the particular cache instance belongs to any of the one or more shared cache groups; and
    waiting to change the particular data only when the metadata indicates that the particular cache instance belongs to at least one of the one or more shared cache group.

30. The one or more storage media of claim 18, wherein the instructions, when executed by one or more computing devices, further cause performance of:
    propagating changes in the backend data source to the plurality of mid-tier databases.

31. One or more storage media storing instructions which, when executed by one or more computing devices, cause performance of:
    maintaining a grid of mid-tier databases storing cache instances of elements from one or more one or more backend data sources, wherein changes to said cache instances are propagated back to the one or more backend data sources;
    receiving a request to change data in a particular mid-tier database, said data belonging to a particular element in the one or more backend data sources;
    in response to the request:
        determining whether the particular mid-tier database stores a particular cache instance corresponding to the particular element;
        responsive to determining that the particular mid-tier database stores the particular cache instance corresponding to the particular element:
            determining that the particular mid-tier database has been assigned exclusive ownership of the particular cache instance;
        responsive to determining that the particular mid-tier database does not store the particular cache instance corresponding to the particular element:
            determining whether any other mid-tier database in the grid stores the particular cache instance corresponding to the particular element;
            responsive to determining that an other mid-tier database stores the particular cache instance corresponding to the particular element:
                causing any pending transactions relating to the particular cache instance at the other mid-tier database to be committed;
                moving the particular cache instance from the other mid-tier database to the particular mid-tier database;
            responsive to determining that no other mid-tier database stores the particular cache instance corresponding to the particular element:
                generating the particular cache instance for the particular element;
                storing the particular cache instance at the particular mid-tier database;
            upon storing the particular cache instance at the particular mid-tier database, determining that the particular mid-tier database has been assigned exclusive ownership of the particular cache instance;
    changing the data in the particular mid-tier database upon determining that the particular database has been assigned exclusive ownership of the particular cache instance.

* * * * *

UNITED STATES PATENT AND TRADEMARK OFFICE
CERTIFICATE OF CORRECTION

PATENT NO. : 8,401,994 B2
APPLICATION NO. : 12/562928
DATED : March 19, 2013
INVENTOR(S) : Chi Hoang et al.

It is certified that error appears in the above-identified patent and that said Letters Patent is hereby corrected as shown below:

On the title page, item [75]
Please delete "Susan Cheng" and replace with --Susan Cheung--.

Signed and Sealed this
Twenty-first Day of May, 2013

Teresa Stanek Rea
*Acting Director of the United States Patent and Trademark Office*